United States Patent Office 3,758,316
Patented Sept. 11, 1973

3,758,316
REFRACTORY MATERIALS AND PROCESS
FOR MAKING SAME
Donald M. Sowards, Claymont, Del., assignor to E. I. du
Pont de Nemours and Company, Wilmington, Del.
No Drawing. Continuation-in-part of abandoned application Ser. No. 780,182, Nov. 29, 1968. This application Mar. 30, 1971, Ser. No. 129,585
Int. Cl. C04b 35/00
U.S. Cl. 106—55  8 Claims

ABSTRACT OF THE DISCLOSURE

Small dimensional changes during gelling, curing, and drying, and high modulus of transverse rupture strengths in refractory materials prepared from refractory powders, binder precursors, and gelling agents are obtained by careful control of the amount of acid present during the gelation step.

CROSS REFERENCE TO RELATED APPLICATION

This application is a continuation-in-part of my copending application Ser. No. 780,182, filed Nov. 29, 1968, now abandoned.

BACKGROUND OF THE INVENTION

It is known that refractory materials can be prepared by admixing a refractory powder, an inorganic binder precursor, and a large amount of a gelling agent to form a refractory mixture and thereafter permitting the resulting mixture to gel, cure, and dry to a solid material. Generally, when such a process has been used in the past, it was felt that the gelling step should take place rather quickly, usually within the range of 2 minutes to 30 minutes. This rapid gel time was the result of the customary use of a large amount of gelling agent. The resulting cured and dried refractory compositions have the disadvantage that they generally have modulus of transverse rupture strengths in the range of from 100 p.s.i. to about 1000 p.s.i. Thus, in the past it has not been possible to obtain strengths in excess of about 1000 p.s.i. In addition, prior art materials have a tendency to shrink considerably during gelation or drying.

The object of this invention is to overcome the above-mentioned disadvantages by preparing refractory materials having (1) modulus of transverse rupture strengths above 1000 p.s.i., preferably above 1700 p.s.i., and (2) improved dimensional stability during gelling, curing, and drying.

SUMMARY OF THE INVENTION

It has been found that controlling the conditions during gel-bond formation so as to achieve a better balance between acidic components (from the gelling agent) and basic components (from the binder precursor) results in the achievement of the above-mentioned desirable properties. Refractories made in accordance with the process of this invention are prepared by:

(1) admixing a refractory powder; an inorganic binder precursor which can liberate $SiO_2$, $Al_2O_3$, $TiO_2$, or $ZrO_2$; a small and controlled amount of a gelling agent; and optionally a diluent, to form a refractory mixture;
(2) gelling the resulting mixture slowly, generally within a period of from 0.5 hour to 3 days, preferably from within 1 hour to 3 hours, under controlled conditions, and
(3) thereafter curing and drying the gelled refractory. For the convenience of shaping the refractory mixture of step (1), it is preferred that the mixture be thixotropic and have a thixotropic set time of about 10 seconds to 3 minutes.

It has been found that there is a relationship between (i) the amount of hydrogen ion (acid) present during gelling and (ii) the final properties of the cured and dried refractory material. When the concentration of hydrogen ion present during the gelling ranges from pH=6.0 to pH=9.5, and preferably pH=6.5 to pH=8.5, high transverse rupture strengths of the cured and dried materials and minimum shrinkage are obtained. When soluble metal silicates, such as sodium or potassium silicates, are used as the binder precursors, it is desirable that the gelling be conducted in such a manner that in addition to having the desired hydrogen ion concentration, the terminal portion of the gelling occurs at neutral (pH about 7.0) or under basic (pH between above about 7.0 and 9.5) conditions. Other binder precursors, such as organic silicates, organic zirconates, or organic titanates, may, however, cure under acidic conditions (pH between 6.0 and about 7.0) during the terminal portion of the gelling. The terminal portion of the gelling step is the time period between (i) the time gel initially sets and (ii) the time the gel can be handled.

The concentration of the binder precursor should be such that the amount of the respective oxide $SiO_2$, $Al_2O_3$, $TiO_2$, or $ZrO_2$ that is released in the gelling process is 10 to 35 g. per 100 ml. of the total liquid present in the mixture. It is assumed that these oxides are released quantitatively from the binder precursors in the gelling process. For the purposes of this disclosure, the term "liquid" means water and any other component which is normally liquid under the conditions of mixing. The relative proportions of the oxide from the binder precursor and the refractory powder should be 5–30 parts by weight of the oxide per 100 parts by weight of the powder.

DETAILED DESCRIPTION OF THE INVENTION

The gelled refractory must be cured and dried before it is used. Curing takes place after gelling and may take up to 20 times as long, preferably 10 times as long as gelling. After the product is cured it must be dried to remove any moisture. Drying may occur during curing under some conditions and thus curing and drying may occur simultaneously. The object of the drying is to remove all water from the refractory material.

A large number of insoluble refractory powders or precursors thereof previously known for making refractory materials can be used in the process of this invention. Examples of such powders are alumina ($Al_2O_3$), α-alumina, aluminum metal produced by a hammer mill process, silicon carbide (SiC), zircon ($ZrSiO_4$), zirconia ($ZrO_2$), magnesia (MgO), chromia ($Cr_2O_3$), titania ($TiO_2$), silica ($SiO_2$), and combinations thereof, as well as refractory borides, nitrides, silicides, and carbides of various metals such as aluminum, chromium, zirconium, tungsten, molybdenum, and titanium. The refractory powder or precursor thereof must be selected on the basis of the intended final use. For example, aluminum, magnesium, silicon, and several other metal powders react with acid or basic binder precursors to adjust toward a neutral gel-forming condition. The generation of gas bubbles during reaction by these materials can be a problem for forming dense structures but advantageous for forming low density materials. Alpha-alumina, on the other hand, is non-reactive and thus suitable for making high density materials.

The binder precursor can be any material that can be caused to generate an inorganic gel. Suitable precursors include soluble silicates such as sodium silicate ($SiO_2$/$Na_2O$), ethyl orthosilicate $Si(OCH_2CH_3)_4$; soluble aluminates such as sodium aluminate ($NaAlO_2$); and colloidal oxides such as silica, alumina, thoria (ThO₂), zirconia, or titania. The preferred precursor is sodium silicate wherein the ratio of SiO₂ to Na₂O varies between about 2.25:1 and 3.25:1.

The gelling agent is any material that will cause the binder precursor to gel. Examples of suitable gelling agents include sodium fluorosilicate ($Na_2SiF_6$), potassium fluorosilicate ($K_2SiF_6$), organic esters and urea,

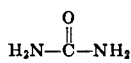

which undergo controlled rates of hydrolysis with the proper conditions of solubility, acidity, and/or heat. Gelling generally will occur at room temperature, however, higher temperatures may be used. It can be expected that higher temperatures will give shorter gel times. To achieve the higher strengths of this invention one must judiciously control the ratio of the binder precursor to gelling agent in such a manner that the rate of generation of hydrogen ion precludes the presence of an excess of hydrogen ion during gelation, i.e., the hydrogen ion concentration is maintained between pH=6.0 and pH=9.5. The properties of a silica gel depend upon the concentration of such hydrogen ion. In the case where sodium fluorosilicate is used as a gelling agent and sodium silicate is used as a binder precursor it is important to control the amount of hydrogen ion in such a manner that gelation follows a certain reaction mechanism.

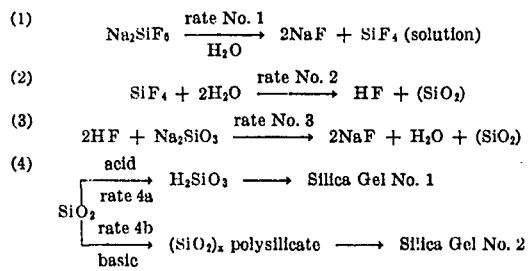

As illustrated in the above equations, the rate of dissolution (Equation 1), the rate of hydrolysis (Equation 2), and the rate of neutralization (Equation 3), all contribute to the instantaneous conditions under which the silica gel bond of this invention (Equation 4b) is formed. The prior art bonds are formed under different conditions (Equation 4a). Silica gels made according to this invention via Equation 4b have improved properties over those made by the prior art process of Equation 4a.

It should be noted that when certain binder precursors are used, the gel bonding may take place under acid conditions. Urea undergoes both acid and base catalyzed hydrolysis:

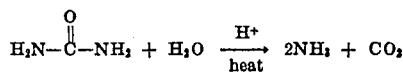

The ammonia can be generated under controlled conditions to produce regulated increases of pH. This gelling agent is used to cause gel bond formation with acidic colloidal oxide sols, such as alumina or thoria:

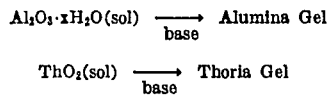

Another acid controlled reaction is based on organic orthosilicates:

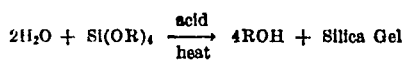

It should be understood, however, that any material which will generate hydrogen ion upon hydrolysis may operate as a gelling agent. The amount of gelling agent relative to the quantity of binder precursor used must be determined in each instance to achieve the desired degree of strength.

A diluent may be added to the reaction mixture for assisting in controlling such factors as wetting, viscosity, thixotropy, drying rate, etc. Examples of suitable diluents which may be used are aqueous solutions of carboxymethyl cellulose, aqueous solutions of sodium carboxymethyl cellulose, agar, detergents, and aqeous solutions of "Kelzan." Kelzan is a colloidal polymer prepared by the whole culture fermentation of a medium by the bacterium *Xanthomanas compestris* in the manner described in U.S. Pat. 3,067,038.

As mentioned above, the refractory materials produced by the process of this invention have several improved properties. A significant feature is the fact that the refractory materials have modulus of transverse rupture strengths in excess of 1000 p.s.i., usually in excess of 1250 p.s.i. A further advantage is that dimensional changes during gelling are controlled or eliminated. Shrinkage normally encountered in prior art binding and drying of conventional refractory materials is essentially eliminated. It has been found that refractory bodies made by using the principles of this invention shrink less than 2.0% in linear dimension during gelation. Preferably the compositions shrink less than 1%, and more preferably less than 0.4% during gelation. This property permits the fabrication of complex, three-dimensional structures. Still a further advantage of this process lies in the fact that the fully cured and dried resulting bonded structures are stable during exposure to elevated temperatures, moisture, and other usually adverse conditions encountered in production of refractories.

UTILITY

The materials produced by the present process are useful wherever high strength refractories are used, and in particular are useful in making metal-ceramic structures. These latter structures are made by casting molten metal around ceramic cores as is more fully described in U.S. Pat. 3,568,723 the disclosure of which is incorporated herein by reference. The ceramic structures are useful for making pipes and manifolds which can be used in exhaust systems of internal combustion engines. The refractory materials of this invention are particularly desirable for making complex molded articles. After the refractory powder, gelling agent, and binder precursor are mixed, a deformable element results which can be formed into any desired shape. After being formed, the element is allowed to cure, thereby producing the useful article.

The following examples serve to illustrate the invention. In the examples, proportions are based on parts by weight and the modulus of transverse rupture strength is measured by ASTM C133–55.

Example 1

One hundred parts of Alcoa tabular alumina powder (325 mesh) is mixed with fine, powdered sodium fluorosilicate. Thirty parts of 38° Bé. sodium silicate (SiO₂/Na₂O ratio 3.25/1.00) is quickly stirred into the powder. About 6 to 8 parts of 1% aqueous carboxymethyl cellulose is blended to give a thixotropic consistency that flows smoothly on a vibrating table.

The mixture is vibrated into a ¼″ x ½″ rectangular 12″ bar mold and covered and in contact with a thin Mylar® sheet. The total mixing and casting time is about 3 minutes. The Mylar® film is periodically tested with a lifting motion. The set-time is judged by the time elapsed when it released clearly from the cast material.

The mold is removed and the bars are allowed to air dry at room temperature. The acidity of the air dried cast material is tested with moistened pH-indicating paper. The results of varying the amount of gelling agent are shown in Table I.

TABLE I

| Added parts of gelling agent | Gel time, minutes | pH of dried composition | Sample strength (p.s.i.) | |
|---|---|---|---|---|
| | | | Dried | After 30 min. at 500° C. |
| 4 | [1] 5 | Acid (less than 6) | 210 | 210 |
| 3 | [1] 8 | ___do___ | 590 | 510 |
| 2 | [1] 14 | Acid (6.5) | 1,220 | 1,160 |
| 1.5 | 22 | Neutral (7.0) | 1,400 | 1,800 |
| 1.25 | 45 | Basic (8.0) | 1,700 | 2,300 |
| 1.0 | 75 | Basic (8.5) | 1,900 | 2,380 |

[1] Approximate.

The amount of silica released in the gelling process per 100 ml. of the total liquid present in the mixture can be readily calculated from the above data, as shown below:

Sodium silicate sol of 38° Bé. ($SiO_2/Na_2O$ ratio 3.25/1.00) has a density of 1.355 g./ml.; the $SiO_2$ concentration is 28.4 weight percent; and the $Na_2O$ concentration is 8.7 weight percent. Thus, 100 g. of this sodium silicate contains 37.1 g. of solids and 62.9 g. of water, or 62.9 ml. of water; and 30 g. of 38° Bé. sodium silicate contains 18.9 ml. of water. Together with, say 8 ml. of 1% carboxymethylcellulose, the total volume of water is about 26.9 ml., and the total weight of $SiO_2$ available from the sodium silicate is 8.52 g. The concentration of $SiO_2$ then is 31.6 g. per 100 ml. of liquid present. Furthermore, in this example 8.52 g. of binder $SiO_2$ is available per 100 g. of the refractory powder.

Example 2

Samples are prepared by the procedure of Example 1, except that the amount of sodium silicate and sodium fluorosilicate is varied simultaneously. The results are shown in Table II.

TABLE II

| Added parts of— | | Gel time, minutes | Sample strength (p.s.i.) | |
|---|---|---|---|---|
| Sodium silicate | Sodium fluoro-silicate | | Dried [1] | After 30 min. at 500° C. |
| 30 | 1.0 | 75 | 1,900 | 2,380 |
| [2] 45 | 1.5 | 65 | 2,930 | 2,790 |
| [2] 60 | 2.0 | 60 | 3,090 | 3,760 |

[1] The dried samples, tested with moist pH indicating paper, have a pH between 8 and 9.
[2] The 1% solution of carboxymethyl cellulose is omitted from these samples.

Example 3

Samples are prepared according to the procedure of Example 1 using several materials as gelling agents. The samples are allowed to set in an atmosphere of 100% relative humidity at several temperatures. The results are shown in Table III.

TABLE III

| Parts of neutralizer [1] | Gelling temperature, ° C. | Gel time, minutes | Sample strength,[2] p.s.i. |
|---|---|---|---|
| 1 potassium fluorosilicate | 26 | 70 | 1,760 |
| Do | 40 | 42 | 1,640 |
| Do | 60 | 26 | 2,060 |
| 1.5 urea | 80 | 110 | 1,600 |
| 2.0 ethyl acetate | 60 | 90 | 1,280 |

[1] All of the dried samples give a basic test with moistened pH-indicating paper.
[2] After oven drying 30 min. at about 200° C.

Example 4

Samples are prepared by the procedure of Example 1, using 1 part sodium fluorosilicate, except that the solid being bonded is varied as shown in Table IV.

TABLE IV

| Parts of solids | Gel time, minutes [1] | Percent linear dimensional change on drying | Sample strength, p.s.i. | |
|---|---|---|---|---|
| | | | Dried [2] | After 30 min. at 1,000° C. |
| 100 α-alumina | 75 | −0.4 | 1,900 | 2,100 |
| 100 Zircon | 75 | 0 | 1,790 | 2,430 |
| 100 Zirconia | 70 | −0.4 | 1,450 | 1,300 |
| 50 α-alumina } | 70 | −0.2 | 3,900 | 4,000 |
| 50 zircon } | | | | |

[1] All samples have a thixotropic set time of about 2 minutes.
[2] The dried products, tested with moist pH indicating paper, have a pH of about 8.

The thixotropic set times of the materials prepared in Example 4 is determined as follows. The mixture of refractory powder, binder precursor, and gelling agent flow under vibration to form a smooth layer about ½-inch deep on a plastic board 6″ x 6″ square. The thixotropic set time is determined by allowing the layer to "rest," without vibration for a period of time (the set time), and then tilting the board at an 85° angle to observe its resistance to deformation during 5 minutes in this position. The period of time at which no deformation occurs is the set time. It has been found that products which resist deformation after "rest" times (set times) of from 10 seconds to 3 minutes are suitable for use in forming structures which will have adequate dimensional stability during gelling, curing, and drying.

Example 5

The dimensional stability during drying and heating of the following refractory materials uniquely qualifies them for preparation of the unfired ceramic elements described in the above-mentioned U.S. Pat. 3,568,723.

A mixture of the following materials (parts by weight) is blended:

| | |
|---|---|
| Aluminum power | 947 |
| Alumina (325 mesh) | 542 |
| Hollow alumina bubbles | 1472 |
| Sodium silicate | 970 |
| 0.6% aqueous Kelzan solution | 100 |

About 33 parts of finely powdered sodium fluorosilicate is blended quickly into the mixture and it is extruded into a mold. After 65 minutes the mold is opened to permit the set composition to be cured and air dried for 24 hours. The strong, dried solid retains the exact dimensions and shape as the mold after an additional drying at 105° C. for 24 hours.

The material is removed from the mold and fired in an air atmosphere according to the following schedule:

| | Hours |
|---|---|
| (1) Up to 700° C. | 4.25 |
| (2) At 700° C. | 22.75 |
| (3) 700° to 900° C. | 0.75 |
| (4) At 900° C. | 25.00 |
| (5) 900° to 1150° C. | 1.75 |
| (6) At 1150° C. | 22.00 |

The furnace is cooled during 8 hours. The fired item is converted to a strong, high alumina, insulating ceramic that is the same size and shape as the mold.

Example 6

275 grams of tabular alumina is mixed with 100 grams of ethyl orthosilicate. Thereafter 45 grams of a 0.1 N solution of hydrochloric acid is quickly mixed therein. The product is cast into a thin-walled plastic mold. The mold is then placed into an oven at 60–65° C. and 100% relative humidity. The product sets in about 200 minutes. The product is cooled, removed from the mold, and air dried. The resulting refractory has a modulus of transverse rupture strength of 1310 p.s.i. and shows no dimensional variation from that of the mold. Moistened pH indicating paper shows that the dried article has a pH of about 6.

Example 7

175 parts of minus 325 mesh alumina powder was mixed with 1.2 parts of fine sodium fluorosilicate powder; 30 parts of 38° Bé. sodium silicate diluted with 30 parts of water was added to the powder, and the mixture was cast in a rectangular mold. This was covered with a thin plastic sheet, which was lifted periodically until setting was indicated, after 145 minutes. The mold was removed and the object was permitted to cure during 22 hours. The resulting block was dried at 120° C. for five hours, and it had a transverse rupture strength of 1018 p.s.i.

I claim:

1. A process for preparing a refractory material which (i) has a modulus of transverse rupture in excess of 1000 p.s.i. and (ii) does not change in linear dimension more than 2% during gelling, curing, and drying; said process comprising the following sequential steps:
   (a) mixing a refractory powder, a binder precursor, and a gelling agent to form a refractory mixture; said binder precursor being selected from a group consisting of soluble silicates, soluble aluminates, colloidal alumina, colloidal thoria, colloidal zirconia, colloidal titania and mixtures thereof; and being able to release in the gelling step an oxide from the class of $SiO_2$, $Al_2O_3$, $TiO_2$, $ThO_2$, or $ZrO_2$;
   (b) slowly gelling the resultant refractory mixture during a period of 0.5 hour to 3 days to obtain a refractory gel; and
   (c) curing and drying the refractory gel to obtain the refractory material
   with the following provisos:
   (1) the ratio of the gelling agent to the binder precursor is such as to maintain a pH of between about 6.0 and 9.5 during gellation;
   (2) the concentration of the binder precursor is such that the amount of the oxide released is 10–35 grams per 100 milliliters of the total liquid; and
   (3) the relative proportions of the oxide from the binder precursor and the refractory powder are 5–30 parts by weight of the oxide per 100 parts by weight of the powder.

2. The process of claim 1 wherein the pH is about 6.5–8.5.

3. The process of claim 1 wherein a diluent is mixed in step (a) with the refractory powder, binder precursor, and gelling agent.

4. The process of claim 1 wherein the refractory mixture of step (a) is thixotropic and has a thixotropic set time of about 10 seconds to 3 minutes.

5. The process of claim 1 wherein the binder precursor is a soluble silicate.

6. The process of claim 5 wherein the soluble silicate is sodium silicate.

7. The process of claim 6 wherein the portion of the gelling step between the time the gel initially sets and the time the gel can be handled occurs at a pH of about 7–9.5.

8. A refractory material produced by the process of claim 1.

References Cited

UNITED STATES PATENTS

| | | | |
|---|---|---|---|
| 2,208,571 | 7/1940 | Dietz et al. | 106—84 |
| 2,380,945 | 8/1945 | Collins | 106—69 |
| 2,603,570 | 7/1952 | Bole | 106—84 |
| 2,662,022 | 12/1953 | Dietz | 106—84 |
| 2,839,416 | 6/1958 | Dietz | 106—84 |
| 2,949,375 | 8/1960 | Reuter | 106—84 |
| 3,102,037 | 8/1963 | Kimpel | 106—84 |
| 3,138,471 | 6/1964 | Wygant | 106—84 |
| 3,178,299 | 4/1965 | Wilborn | 106—84 |
| 3,445,257 | 5/1969 | Hloch et al. | 106—84 |

JAMES E. POER, Primary Examiner

U.S. Cl. X.R.

106—57, 65, 69, 84

Disclaimer and Dedication 3,758,316.—*Donald M. Sowards,* Claymont, Del. REFRACTORY MATERIALS AND PROCESS FOR MAKING SAME. Patent dated Sept. 11, 1973. Disclaimer and Dedication filed Nov. 24, 1987, by the assignee, *Engelhard Corp.*

Hereby disclaims and dedicates to the Public all claims of said patent.
[*Official Gazette February 16, 1988.*]